United States Patent [19]
Mason et al.

[11] Patent Number: 5,869,160
[45] Date of Patent: Feb. 9, 1999

[54] RELEASE COATED LINERS AND SECURITY LABELS CONTAINING SUCH RELEASE COATED LINERS

[75] Inventors: Daniel T. Mason, Rochester Hills, Mich.; Thomas C. Epple, Madison, Ohio

[73] Assignee: Avery Dennison Corporation, Pasadena, Calif.

[21] Appl. No.: 659,904

[22] Filed: Jun. 7, 1996

[51] Int. Cl.[6] ................................................ B32B 3/26
[52] U.S. Cl. ........................... 428/40.2; 283/72; 283/83; 283/114; 428/41.6; 428/41.8; 428/42.1; 428/915; 428/916
[58] Field of Search .................. 428/40.1, 40.2, 428/41.6, 41.8, 42.1, 915, 916; 283/72, 83, 114

[56] References Cited

U.S. PATENT DOCUMENTS

| | | | |
|---|---|---|---|
| 3,383,121 | 5/1968 | Singer | 282/28 |
| 4,182,788 | 1/1980 | Vassiliades et al. | 428/40 |
| 4,268,983 | 5/1981 | Cook | 40/2.2 |
| 4,606,956 | 8/1986 | Charbonneau et al. | 428/40.1 |
| 4,721,638 | 1/1988 | Matsuguchi et al. | 428/40.1 |
| 4,746,556 | 5/1988 | Matsuguchi et al. | 428/40.1 |
| 4,846,502 | 7/1989 | Chang et al. | 283/57 |
| 4,987,287 | 1/1991 | Jack | 219/121.69 |
| 5,039,652 | 8/1991 | Doll et al. | 503/206 |
| 5,042,842 | 8/1991 | Green et al. | 283/10 |
| 5,151,572 | 9/1992 | Jack | 219/121.69 |
| 5,312,680 | 5/1994 | Simpson | 428/321.5 |
| 5,346,259 | 9/1994 | Mocilnikar et al. | 283/108 |
| 5,346,738 | 9/1994 | Samonides | 428/40.1 |

OTHER PUBLICATIONS

Avery Dennison, "Anti–Theft Talking and Window Etching Systems."
PCT/US97/08559; PCT International Search Report mailed Sep. 10, 1997.

*Primary Examiner*—Nasser Ahmad
*Attorney, Agent, or Firm*—Renner, Otto, Boisselle & Sklar

[57] ABSTRACT

A release coated liner and security labels containing such release coated liners are described. In one embodiment the labels comprise (A) a sheet having an upper and a lower surface;

(B) an adhesive layer having an upper surface and a lower surface and having its upper surface in contact with the lower surface of the sheet; and (C) a liner with a release coating removably affixed to the lower surface of the adhesive layer (B) wherein the release coating contains a microencapsulated material which is capable of marking a substrate when (a) at least some of the capsules are broken, (b) the liner with release coating is removed from the label, and (c) the label, without liner and release coating is applied to a substrate.

The sheet (A) may be a multilayer sheet. In preferred embodiments, the microencapsulated material is an etchant or a fluorescent agent. The security labels may be applied to glass or metal and is preferably applied to painted glass or metal. When graphics or other printing are applied to the security labels by an impact-type printer, the capsules in the release coating are broken in the area of impact, and when the liner with release coating is subsequently removed from the label and the label is applied to a substrate, the material which has been released from the broken capsules will leave an imprint on the substrate.

40 Claims, 1 Drawing Sheet

RELEASE COATED LINERS AND SECURITY LABELS CONTAINING SUCH RELEASE COATED LINERS

TECHNICAL FIELD OF THE INVENTION

This invention generally relates to release coated liners and security labels, and more particularly, to tamper-proof, security and marking labels which leave a readable footprint if removed from an article to which the label has been applied.

BACKGROUND OF THE INVENTION

Labels have been used extensively on articles which are to be sold to indicate the price and/or the identity of the articles such as a stock number. Uniform product codes (UPC) are frequently placed on labels or directly on goods to identify the goods. Transferring price and identification labels from one item to another is a constant problem faced by store-owners, especially in retail areas where customers may switch labels to pay a lower price for the goods.

Label integrity also is vital in the pharmaceutical industry. Switched labels or mis-marked products can cause devastation or fatal results. Counterfeiting of products, and black market resale of original equipment parts are continuing problems. Accordingly, there is a need to permanently mark automotive parts in order to control the use of stolen parts in auto repair work and reduce auto theft.

Labels with vehicle identification numbers (VIN) can readily be produced, but such labels also can be readily removed without in any way damaging the part. Stamping of metal parts with the VIN is prohibitively expensive, and where a part is a thin metal part, such stamping operation may not be undertaken without damaging the part. Thus, there is a need for a practical way to mark automobile parts with identification numbers in such a way that the part can be readily identified with a particular automobile owner, and the marking is not readily removable.

Numerous label designs for tamper-proof labels have been described which provide an indication of the authentification. U.S. Pat. No. 5,042,842 (Green et al) employs a multilayer label consisting of a lower sheet of safety paper and an upper sheet. The lower sheet of safety paper is attached by a permanent adhesive to a product, and the upper sheet is attached by a patterned adhesive layer to the lower safety paper layer. Graphics, price information and variable serial numbers or model numbers can be printed on the top of the upper sheet. Indicia of authentication are printed on the bottom surface of the upper sheet. Authentication requires that the upper portion of the label including the upper sheet be separated from the lower safety paper sheet. Once separated, the layers cannot be rejoined to reconstitute the label. In addition, removal of the top portion is required in order to tell if an additional label has been placed over the top of the upper portion of the label.

U.S. Pat. No. 5,346,738 (Samonides) describes an identification label containing a microencapsulated etchant. The identification label is useful for marking a metal or other etchable surface such as an automobile part with an identifying indicia. The label comprises a protective cover sheet, a pressure-sensitive adhesive irremovably affixed to the cover sheet, and a liner with a release coating removably affixed to the adhesive. An identifying indicia comprising an etchant in a visible vehicle such as a printing ink is printed on the adhesive at the interface of the removable liner and the adhesive so that when the liner is removed, the remaining portions of the label will be adhesively attached to the metal surface with the etchant of the identifying indicia in etching contact therewith. The identifying indicia will thus be etched into the surface of the part for a permanent marking of the part.

U.S. Pat. No. 5,346,259 (Mocilnikar et al) describes a tamper-proof label comprising a thicker support material and a thinner fragile portion. The label is formed of a plurality of layers of varnish, adhesive, plastic and ink. The label incorporates an authentication region in which the text can be readily deciphered only with a special viewer. The top surface of the label can be written on with ink and is difficult to erase without destroying the fragile portion of the label. The label is adhered to a product by an adhesive which becomes aggressively bonded to the product over a relatively short period of time. In addition, the adhesive leaves a residue which is visible when illuminated with ultraviolet light.

SUMMARY OF THE INVENTION

A release coated liner and security labels containing such release coated liners are described. In one embodiment the labels comprise (A) a sheet having an upper and a lower surface;

(B) an adhesive layer having an upper surface and a lower surface and having its upper surface in contact with the lower surface of the sheet; and (C) a liner with a release coating removably affixed to the lower surface of the adhesive layer (B) wherein the release coating contains a microencapsulated material which is capable of marking a substrate when (a) at least some of the capsules are broken, (b) the liner with release coating is removed from the label, and (c) the label, without liner and release coating is applied to a substrate.

The sheet (A) may be a multilayer sheet. In preferred embodiments, the microencapsulated material is an etchant or a fluorescent agent. The security labels may be applied to any substrate and is preferably applied to glass or painted substrates such as painted plastic or metal. When graphics or other printing are applied to the security labels by an impact-type printer, the capsules in the release coating are broken in the area of impact, and when the liner with release coating is subsequently removed from the label and the label is applied to a substrate, the material which has been released from the broken capsules will leave an imprint on the substrate.

DETAILED DESCRIPTION OF THE PREFERRED EMBODIMENTS

Figure 1:
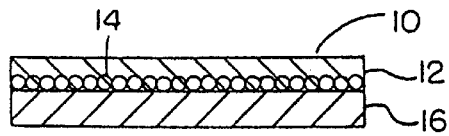
FIG. 1 is a side, cross-sectional view of a release coated liner of the invention.

In one preferred embodiment, the present invention relates to security labels to be applied to articles to provide the article with a marking that a later purchaser, recipient or other interested party can use not only to receive the information coded into the label, but also to judge the origin or authenticity of the article. The present invention provides a method for not only determining the authenticity of the label present in the article but also provides a method for determining the authenticity and identity of the article by applying an identification code onto the article itself, and this identification remains even if the label is removed in its entirety. The security labels of the present invention are useful in marking glass or metal. For example, an etchant can be included in the capsules used in the present invention which will be effective for etching glass or metal parts with information such as an identification number. Alternatively, the label of the invention may contain capsules of a fluorescent agent or powder which can be transferred to glass or a painted surface such as painted metal or plastic thereby providing the painted surface or glass with an identification number. If an etchant is used, the identification number will be readily observable, and if the marking material is a fluorescent agent, the identification number on the part can be viewed with infrared or ultraviolet light only.

A critical feature of the security labels of the present invention is the type of release coated liner used in preparing the security labels. Thus, in one embodiment, the present invention relates to a release coated liner wherein the release coating on the liner comprises a silicone release composition and capsules of a microencapsulated material capable of marking a substrate. Preferred examples of such materials include etchants or and fluorescent agents. Etchants which are known in the art to be useful for etching glass or metals can be encapsulated and used in the release coatings of the present invention. Metal and glass etchants include mineral acids such as dilute hydrochloric acid carried in an ink or other printing fluid. A procedure for microencapsulating hydrochloric acid in a polystyrene wall material which holds the acid until the wall material is ruptured is described in U.S. Pat. No. 5,346,738, and the description of the procedure found in columns 4 through 6 is hereby incorporated by reference.

Similar techniques may be utilized to form microencapsulated fluorescent agents or powders. Useful fluorescent agents are available commercially under the general trade designation CALCOFLOR RWP from Keystone Aniline Co., Chicago, Ill.

The release coating composition comprising a silicone release composition and the capsules of microencapsulated materials described above can be prepared by mixing the microencapsulated material with a silicone-release composition and thereafter applying the mixture to the liner utilizing techniques well-known to those skilled in the art. The amount of the capsules of material incorporated into the silicone-release composition should be an amount sufficient to provide for a clear footprint when the capsules contained in a label are broken by an impact printer. Thus, it is preferred that there is essentially capsule-to-capsule contact throughout the release coating once it is applied to the liner. Generally, the release coating will comprise a mixture of from about 60% to about 95% by weight of a silicone-release composition and from 5% to about 40% by weight of the capsules of microencapsulated material. More often the coating will comprise 70% to 80% by weight of the silicone release composition and from 20% to 30% by weight of the capsules. The size of the capsules is not critical although the diameter of the capsules should not exceed the thickness of the layer or release coating. Capsules with average diameters in the range of 5 to 30 microns are useful.

The liner of the release coated liner of the invention may comprise any of the materials normally used for preparing release coated liners. Thus, the liner may comprise polymer films or paper. Paper liners generally are preferred because of low cost.

As a general rule in the industry, the pressure-sensitive adhesives which are utilized in label constructions, such as the label constructions of the present invention, are supplied commercially on the release coated liners which are to be used in the preparation of the labels. However, since a release coated liner having a layer of pressure-sensitive adhesive on the release coating cannot be readily handled or shipped from one place to another, a second, throw-away release coated liner is often but not always applied to the exposed surface of the adhesive layer to improve handling and shipping. The second release coated liner can be removed easily by the purchaser or recipient when a label is to be prepared containing the pressure-sensitive adhesive and the first release coated liner.

Thus, the present invention also involves the preparation of a multilayer composite useful for preparing labels, and more particularly, marking labels of the type described herein. Such multilayer composites comprise (A) a first release coated liner wherein the release coating comprises a silicone-release composition and capsules of microencapsulated material which is either an etchant or a fluorescent agent;

(B) a layer or pressure-sensitive adhesive having an upper surface and a lower surface, the lower surface being in contact with the release coating; and (C) a second release coated liner in contact with the upper layer of pressure-sensitive adhesive wherein the adhesive bond between the first liner (A) and the adhesive layer (B) is greater than the adhesive bond between the second liner (C) and the adhesive layer (B).

In one preferred embodiment, the material contained in the capsules is a fluorescent agent, and in another preferred embodiment, the first and second release coated liners are paper liners.

Alternatively, the pressure-sensitive adhesive coated, release-coated liner of this invention may be transported as a self-wound roll, and in this instance, the release-coated liner of this invention could be prepared with a second, traditional release-coating on the back side of the liner. For example, this construction could comprise: a liner having the capsule containing silicone release coating on one side; a layer of silicone release composition on the other side (backside) of the liner; and a pressure-sensitive adhesive (no capsules) on the release coating containing the capsules. When this construction is self wound, the layer of pressure-sensitive adhesive is in contact with the backside release coating allowing the roll to be easily unrolled.

Figure 2:
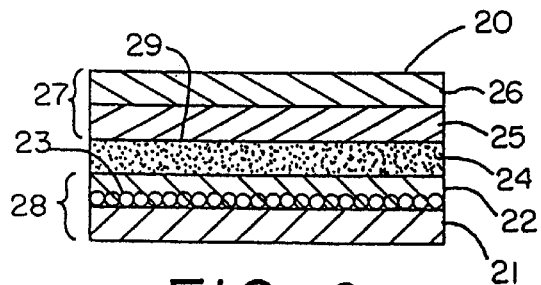
FIG. 2 is a side, cross-sectional view of a composite of the invention containing the release coated liner of the invention.

Some of the above-described embodiments of the invention are further illustrated in FIGS. 1 and 2. FIG. 1 illustrates a release coated liner of the invention 10 comprising a liner 16 and a release coating 12 containing capsules 14 of material capable of marking substrates. FIG. 2 illustrates another embodiment of the invention which is a multilayer structure 20 comprising a first release coated liner 28 comprising liner 21 having a release coating 22 which contains capsules 23. Above, and in contact with, release coating 22 is a pressure-sensitive adhesive layer 24. A second release coated liner 27 is positioned above the adhesive layer 24 and comprises a second liner 26 and a second release coating 25. The second release coating 25 which does not contain the capsules described herein is in contact with the pressure-sensitive adhesive 24. In the embodiment of the invention illustrated in FIG. 2, the adhesive bond between the first release coated liner 28 and the pressure-sensitive adhesive layer 24 is greater than the adhesive bond between the second liner 27 and the adhesive bond 24. As a result, the second release coated liner 27 can be readily removed from the multilayer article 20 leaving the upper surface 29 of the pressure-sensitive adhesive layer 24 exposed and ready for use in preparing security labels in accordance with the present invention.

The above-described release coated liners containing the capsules of etchant or fluorescent agent are useful in preparing various security labels for identifying and/or marking substrates such as glass or metal. In one embodiment, a security label of the invention comprises (A) a sheet having an upper and lower surface;

(B) an adhesive layer having an upper surface and a lower surface and having its upper surface in contact with the lower surface of the sheet; and (C) a liner with a release coating removably affixed to the lower surface of the adhesive layer (B) wherein the release coating contains capsules of a microencapsulated material which is capable of marking a substrate when (a) at least some of the capsules are broken, (b) the liner with release coating is removed from the label, and (c) the label, without liner and release coating is applied to a substrate.

In one embodiment the sheet (A) has an ink-imprintable upper surface, and the label may further include printed graphics or indicia on the upper surface of the sheet (A). For example, if the label is to be used to identify an automobile part for a particular automobile, the printed graphic may be the vehicle identification number (VIN), and if the printed graphic is applied to the label by an impact-type printer, the capsules of etchant or fluorescent agent will be broken by the pressure of the impact-type printer resulting in the release of the etchant or fluorescent agent into the pressure-sensitive adhesive thereby leaving an imprint (footprint) in the pressure-sensitive adhesive corresponding to the VIN number. After printing of the label, the label can be used immediately or at some future time by removing the release coated liner and applying the label to a substrate whereupon the label becomes bonded to the substrate. The authenticity of the label and/or the substrate can be determined subsequently by application of infrared or ultraviolet light to the label or to the substrate if the label has been removed since an infrared or ultraviolet light will reveal the footprint which has been transferred to the part on application of the original label. If the original label has not been removed and replaced with the counterfeit label, the VIN number on the part will correspond to the VIN number on the label. If a different label having the same VIN number has been applied to a substitute part, the substitute part will not have a readable footprint. Even if the original label has been removed in its entirety, the authenticity of the substrate (part) can be verified since the fluorescent footprint which was deposited the original part by the original label can be observed by infrared or ultraviolet light. If the encapsulated material used in the security labels described above as an etchant for metal or glass, and the original label is subsequently removed, the identification number imposed on the substrate by the original label is permanently etched into the part and can be used to authenticate the part.

Figure 3:
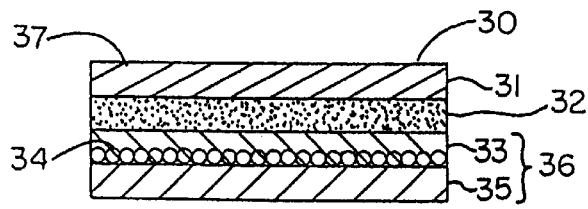
FIG. 3 is a side, cross-sectional view of a tamper-proof label of the invention.

FIG. 3 illustrates the above embodiment of a security label of the present invention. The label 30 illustrated in FIG. 3 comprises a sheet 31 having an upper and lower surface, an adhesive layer 32 having an upper surface and a lower surface and wherein the upper surface of the adhesive layer is in contact with the lower surface of the sheet 31. Below the pressure-sensitive adhesive layer 32 is a release coated liner 36 in accordance with the present invention which comprises a liner 35 and a release coating 33 which contains capsules 34 of marking materials such as etchants and fluorescent agents. Printed graphics (not shown) may be applied to the upper surface 37 of sheet 31.

The sheet 31 may be of any suitable material such as paper or polymer film depending on the desired properties. Generally, the sheet 31 will be a polymer sheet, more particularly, a sheet of polyethylene terephthalate (PET). The sheet 31 may be a thin sheet which is fragile and will tear when an attempt is made to remove the label. The sheet 31 may itself comprise a multilayer sheet comprised of layers of polymer film, adhesive, ink-imprintable varnishes, graphics, leveling primers, etc. In one preferred embodiment, the sheet (A) illustrated in FIG. 3 as layer 31 may have an upper surface which is coated with a layer of an imprintable matte varnish. The matte varnish will accept thermal transfer or dot matrix ribbon printing as well as other inking instruments. Ultraviolet curable matte varnishes useful for forming this varnish layer are available from the Dunmore Corp., Newtown, Pa. Polyethylene terephthalate films coated with a solvent-based gravure imprintable top varnish useful in preparing the labels of this invention also are available from the Dunmore Corp.

Any pressure-sensitive adhesive normally used in label constructions may be used in the labels of this invention. In one embodiment, the pressure-sensitive adhesive layer is a gradually curing adhesive which when initially affixed to a product is mildly aggressive allowing repositioning or removal of the label without damage to the label, and when the adhesive is cured, it is an extremely aggressive adhesive making separation of the label from the product difficult.

In another embodiment, a tamper-proof security and marking label comprises (A) a layer of an imprintable matte varnish having an upper surface and a lower surface;

(B) a layer of a polymer film having an upper surface and a lower surface, and the upper surface is in contact with the lower surface of the varnish layer (A);

(C) a layer of adhesive having an upper surface and a lower surface, and the upper surface is in contact with the lower surface of the layer of polymer film;

(D) a layer of ink-imprintable varnish having an upper surface and a lower surface, and the upper surface is in contact with the lower surface of the adhesive layer (C);

(E) an authentication layer having an upper surface and a lower surface, and the upper surface is in contact with the varnish layer (D);

(F) a pressure-sensitive adhesive layer having an upper surface and a lower surface, and the upper layer is in contact with the lower surface of the authentication layer (E); and (G) a liner with a release coating removably affixed to the lower surface of the adhesive layer (F) wherein the release coating contains a microencapsulated material which is capable of marking a substrate when (a) at least some of the capsules are broken, (b) the liner with release coating is removed from the label, and (c) the label, without liner and release coating is applied to a substrate. In addition, a layer of white ultraviolet cured leveling primer may be inserted between the authentication layer (E) and the pressure-sensitive adhesive layer (F).

Figure 4:
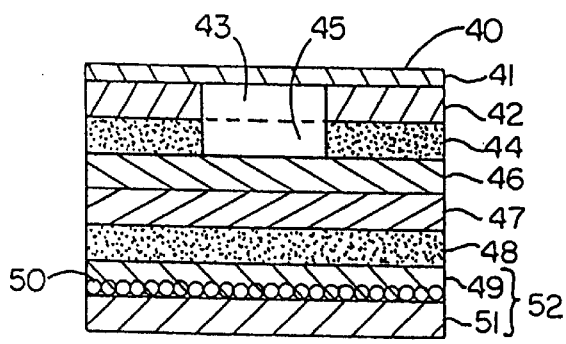
FIG. 4 is a side, cross-sectional view of another label of the invention which contains windows.

In a first preferred embodiment of the above label, the polymer film layer (B) contains a window, and the adhesive layer (C) also contains a window which is aligned with the window on the polymer film (B). This embodiment is illustrated in FIG. 4 where the label 40 comprises a layer of imprintable matte varnish 41; a layer of polymer film 42 having a window 43; and a layer of adhesive 44 which contains a window 45 which is aligned beneath the window 43 of film 42. Beneath the adhesive layer 44 is a layer of imprintable matte varnish 46 (e.g., AC520 varnish available from Avery Dennison Corp.) which is in contact with the lower surface of the adhesive layer 44. Authentication layer 47 is located below the layer of matte varnish 46. A pressure-sensitive adhesive layer 48 is located between the authentication layer 47 and a release coated liner 52 which comprises a liner 51 and a release coating 49 containing capsules 50.

In a second preferred embodiment, the polymer film layer (B) and the adhesive layer (C) do not contain windows. In this embodiment, the varnish layer (D) is a patterned destrux varnish layer. The destrux varnish layer is formed from a silicon-containing varnish which is applied in a manner similar to ink printing. When an attempt is made to remove the label, the destrux varnish layer (D) between the clear acrylic adhesive layer (C) and the "GENU-GRAPHIC" layer (E), adheres to the acrylic adhesive layer (C) and tears away from the "GENU-GRAPHIC" layer (E) forming an irregular tearing pattern. Avery Dennison Destrux Varnish 50301A is acceptable for forming the destrux layer.

Figure 5:
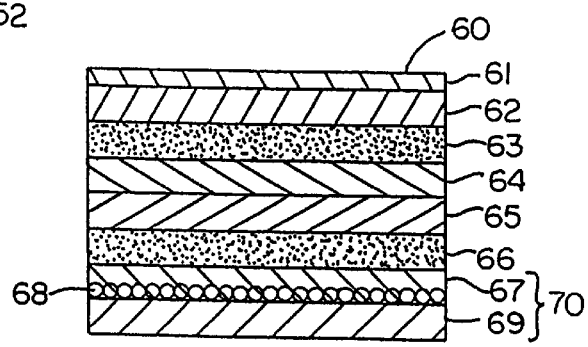
FIG. 5 is a side, cross-sectional view of another label of the invention which does not contain windows.

The above embodiment without windows is illustrated in FIG. 5 where the label is designated as 60. This embodiment comprises a first layer of an imprintable matte varnish 61, a second layer of a polymer film 62, a third layer of adhesive 63, a fourth layer 64 comprising an ink-imprintable patterned destrux varnish, a fifth layer 65 comprising an authentication layer, a sixth layer 66 which is a pressure-sensitive adhesive layer, and a backing sheet 70 comprised of a paper liner 69 with a release coating 67 containing capsules 68 of a fluorescent agent. In another variation of this embodiment the destrux varnish layer 64 can be between the second layer of polymer film 62 and the authentication layer 65. The adhesive layer 63 is eliminated in this variation.

In yet a third variation of the above embodiment, the polymer film layer (B) and the adhesive layer (C) do not contain windows, and the varnish layer (D) does not comprise a destrux varnish layer. In this embodiment, the polymer film layer (B) is a thin and/or fragile film which is destroyed such as by tearing when an attempt is made to remove the label from a substrate to which the label has been applied. Further in this variation, the adhesive layer (C) may be omitted, and the authentication layer (E) may be on top of the thin or fragile polymer film layer (B), i.e., between layers (A) and (B), or below the fragile polymer film layer (B), i.e., between layers (B) and (D).

The first layer of imprintable matte varnish (A) may contain printed indicia. In addition, a fluorescent agent or powder can be included in the varnish which provides a mechanism for determining if an attempt is made to erase the graphics. Any rubbing action associated with erasing will result in a dark smudge when the varnish layer is viewed with ultraviolet light. The matte varnish may be an ultraviolet cured varnish such as the varnish described above which is available from Dunmore Corp.

Generally in the above three embodiments, it is preferred that the materials used to form layers (A), (B) and (C) are selected to produce clear layers. The polymer films used in these embodiments may be any of the films described above. The layer of adhesive (C) is generally a clear, acrylic adhesive layer such as those available from Avery Dennison of Monrovia, Calif., as "clear, acrylic adhesive, P-9." Comparable compounds are available commercially in the industry. The adhesive layer (C) is preferably die-cut to conform to the configuration of the polymer film layer (A). Beneath the adhesive layer (B) is a layer of imprintable varnish which will accept thermal transfer or dot matrix ribbon printing as well as other inking instruments. The ultraviolet curable varnish available from Avery Dennison as number 519 Fasson base material described earlier can be utilized in this layer.

The authentication layer (E) which is beneath the varnish layer (D) generally comprises line-scrambled indicia such as line-scrambled "GENU-GRAPHIC" indicia. The "GENU-GRAPHIC" indicia allows text to be printed on the label which is only viewable with a "GENU-GRAPHIC" viewer which acts as a deciphering lens. More than one graphic message can be printed in this manner if desired. Graphics Security Systems of Lakeland, Fla. licenses the use of GENU-GRAPHIC indicia which is described in U.S. Pat. Nos. 3,937,565; 4,092,654; and 4,198,147.

The "GENU-GRAPHIC" layer provides an authentication pattern on the surface of the label which makes it difficult for a counterfeiter to readily and inexpensively duplicate the labels of the present invention in order to apply them to counterfeit products and sell them as authentic. In addition, the authentication layer using an authenticating viewer can be readily used to detect attempts to remove the outer portion of one label, and place it around the tamper evident window of another label. This provides additional discouragement to those who may be inclined to switch labels on products.

The patterned destrux varnish layer (D) is designed to produce a variable release of the graphics pattern established by the "GENU-GRAPHIC" pattern. This results in a pattern that resembles tearing. This is done to avoid having a segment of the label which separates forming sharp lines. Sharp lines are easily recognized and are more easily matched to a substrate overlaying label than an irregular tearing pattern.

Below the authentication layer is a layer of pressure-sensitive adhesive (F). Any of the pressure-sensitive adhesives known in the art can be utilized in preparing the labels of the present invention. In a preferred embodiment, the pressure-sensitive adhesive is a white pigmented pressure-sensitive, cross-linked acrylic adhesive. In a further embodiment the pressure-sensitive adhesive layer is mildly aggressive when first applied to a product in order to allow repositioning or removal of the label once it has been applied to a product. This adhesive becomes increasingly aggressive as the label is left applied to a product.

In addition to the above layers, the labels may contain a layer of a white ultraviolet-cured leveling primer between the authentication layer (E) and the pressure-sensitive adhesive layer (F). The leveling primer "deadens" the pressure-sensitive adhesive layer and allows the formation of the authentication layer (E) over the pressure-sensitive adhesive layer (F). White ultraviolet curable leveling primers are available commercially such as from Avery Dennison under the designation Avery Dennison Clear Primer AC518. Equivalent materials are available from other sources.

The release coated liners (G) used in the labels of the above embodiments are the release coated liners of the invention containing capsules of marking materials as described above.

Another example of a tamper evident label in accordance with this invention comprises (A) a first layer comprising an imprintable matte varnish containing a fluorescent powder;

(B) a second layer having a window and comprising a clear polymer film having an upper surface and a lower surface and a thickness which is greater than the thickness of the first layer which is positioned above and in contact with the upper surface of the second layer, said clear polymer film being oriented to form a support layer surrounding or surrounded by a fragile layer in which the clear polymer film is not present;

(C) a third layer having a window aligned beneath the window in the second layer and comprising a clear acrylic adhesive adhered to the lower surface of the clear polymer film;

(D) a fourth layer comprising an ink-imprintable varnish which is positioned beneath the clear acrylic adhesive layer;

(E) a fifth layer comprising an authentication layer positioned beneath the varnish layer (D);

(F) a pressure-sensitive adhesive layer located below and in contact with said authentication layer;

(G) a backing sheet below and in contact with the pressure-sensitive adhesive layer comprised of a paper liner with a release coating containing a microencapsulated fluorescent agent.

The labels may also, and generally do contain a layer of a white ultraviolet cured leveling primer between the authentication layer (E) and the pressure-sensitive adhesive layer (F).

In a further embodiment the tamper-evident label of the invention may comprise:

(A) a first layer comprising an imprintable matte varnish containing a fluorescent powder;

(B) a second layer comprising a clear polymer film having an upper surface and a lower surface and a thickness which is greater than the thickness of the first layer which is positioned above and in contact with the upper surface of the second layer;

(C) a third layer consisting of a clear acrylic adhesive adhered to the lower surface of the clear polymer film;

(D) a fourth layer comprising a patterned destrux varnish layer positioned beneath the clear acrylic adhesive layer, or between the layer (B) of polymer film and the acrylic adhesive layer (C);

(E) a fifth layer comprising an authentication layer positioned beneath the patterned destrux varnish layer, said patterned destrux varnish layer causing said authentication layer to appear torn by variably releasing the authentication layer when the label is removed from a substrate to which it has been applied;

(F) a sixth layer of ultraviolet-cured leveling primer below and in contact with the authentication layer (E);

(G) a pressure-sensitive adhesive layer located below and in contact with said layer of leveling primer and which adhesive bonds aggressively to substrates to which the label is affixed; and (H) a backing sheet below and in contact with the pressure-sensitive adhesive layer comprised of a paper liner with a release coating containing a microencapsulated fluorescent agent.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A release coated liner wherein the release coating comprises a mixture of a silicone composition and a microencapsulated material selected from an etchant or a fluorescent agent.

2. The release coated layer of claim 1 wherein the liner is a paper liner.

3. The release coated liner of claim 1 wherein the release coating comprises a silicone composition and a microencapsulated fluorescent agent.

4. A multilayer composite useful for preparing security and marking labels which comprises:

(A) a first release coated liner wherein the release coating comprises a mixture of a silicone composition and a microencapsulated material which is either an etchant or a fluorescent agent;

(B) a layer of pressure-sensitive adhesive having an upper surface and a lower surface, and the lower surface is in contact with the release coating of the first release coated liner (A); and (C) a second release coated liner in contact with the upper layer of pressure-sensitive adhesive wherein the adhesive bond between the first liner (A) and the adhesive layer (B) is greater than the adhesive bond between the second liner (C) and the adhesive layer (B).

5. The composite of claim 4 wherein the microencapsulated material is a fluorescent agent.

6. The composite of claim 4 wherein the first and second release coated liners are paper liners.

7. A security label for identifying and/or marking a substrate which comprises:

(A) a sheet having an upper and a lower surface;

(B) an adhesive layer having an upper surface and a lower surface and having its upper surface in contact with the lower surface of the sheet; and (C) a liner with a release coating removably affixed to the lower surface of the adhesive layer (B) wherein the release coating contains a micro-encapsulated material which is capable of marking a substrate when (a) at least some of the capsules are broken by an impact, (b) the liner with release coating is removed from the label, and (c) the label, without liner and release coating is applied to a substrate.

8. The label of claim 7 wherein the micro-encapsulated material is selected from the group consisting of etchants and fluorescent agents.

9. The label of claim 7 wherein the micro-encapsulated material is an etchant and the substrate is metal or glass.

10. The label of claim 7 wherein the microencapsulated material is a fluorescent agent and the substrate is a painted substrate.

11. The label of claim 10 wherein the painted substrate is a painted metal substrate.

12. The label of claim 7 further including printed graphics on the upper surface of sheet (A).

13. The label of claim 7 wherein the sheet (A) is a multilayer sheet.

14. The label of claim 7 further including printed graphics in the lower surface of sheet (A).

15. The label of claim 7 wherein the release coating comprises a silicone composition.

16. The label of claim 7 wherein the sheet (A) comprises a polymer film.

17. The label of claim 7 wherein the upper surface of the sheet (A) is coated with an imprintable matte varnish.

18. A tamper-proof security and marking label comprising:

(A) a layer of an imprintable matte varnish having an upper surface and a lower surface;

(B) a layer of a polymer film having an upper surface and a lower surface, and the upper surface is in contact with the lower surface of the varnish layer (A);

(C) a layer of adhesive having an upper surface and a lower surface, and the upper surface is in contact with the lower surface of the layer of polymer film;

(D) a layer of ink-imprintable varnish having an upper surface and a lower surface, and the upper surface is in contact with the lower surface of the adhesive layer (C);

(E) an authentication layer having an upper surface and a lower surface, and the upper surface is in contact with the varnish layer (D);

(F) a pressure-sensitive adhesive layer having an upper surface and a lower surface, and the upper layer is in contact with the lower surface of the authentication layer (E); and (G) a liner with a release coating removably affixed to the lower surface of the adhesive layer (F) wherein the release coating contains a microencapsulated material which is capable of marking a substrate when (a) at least some of the capsules are broken, (b) the liner with release coating is removed from the label, and (c) the label, without liner and release coating is applied to a substrate.

19. The label of claim 18 wherein the polymer film layer (B) contains a window, the adhesive layer (C) contains a window below and aligned with the window in the polymer film.

20. The label of claim 18 wherein the polymer film layer (B) and the adhesive layer (C) do not contain windows, and the varnish layer (B) is a patterned destrux varnish layer.

21. The label of claim 18 wherein the polymer film layer (B) and the adhesive layer (C) do not contain a window and the polymer film is a thin and/or fragile film which is destroyed when an attempt is made to remove the label from a substrate to which the label has been applied.

22. The label of claim 18 further comprising a layer of a leveling primer between the authentication layer (E) and the pressure-sensitive adhesive layer (F).

23. The label of claim 18 wherein the microencapsulated material in the release coating is selected from the group consisting of etchants and fluorescent agents.

24. The label of claim 18 wherein the microencapsulated material is an etchant and the substrate is metal or glass.

25. The label of claim 18 wherein the microencapsulated material is a fluorescent agent and the substrate is a painted surface.

26. The label of claim 25 wherein the painted surface is painted metal.

27. The label of claim 18 wherein the authentification layer comprises a line of scrambled indicia.

28. The label of claim 18 wherein the pressure-sensitive adhesive contains a white pigment.

29. The label of claim 18 wherein the matte varnish layer (A) contains a fluorescent powder.

30. A tamper-evident label capable of depositing a footprint on a substrate when the label is printed with an impact printer and the label is applied to a substrate which comprises:

(A) a first layer comprising an imprintable matte varnish containing a fluorescent powder;

(B) a second layer having a window and comprising a clear polymer film having an upper surface and a lower surface and a thickness which is greater than the thickness of the first layer which is positioned above and in contact with the upper surface of the second layer, said clear polymer film being oriented to form a support layer surrounding or surrounded by a fragile layer in which the clear polymer film is not present;

(C) a third layer having a window aligned beneath the window in the second layer and comprising a clear acrylic adhesive adhered to the lower surface of the clear polymer film;

(D) a fourth layer comprising an ink-imprintable varnish which is positioned beneath the clear acrylic adhesive layer;

(E) a fifth layer comprising an authentication layer positioned beneath the varnish layer (D);

(F) a pressure-sensitive adhesive layer located below and in contact with said authentication layer;

(G) a backing sheet below and in contact with the pressure-sensitive adhesive layer comprised of a paper liner with a release coating containing a microencapsulated fluorescent agent.

31. The label of claim 30 further containing a layer of a white ultraviolet cured leveling primer between the authentication layer and the pressure-sensitive adhesive layer.

32. The label of claim 30 wherein the authentication layer further comprises a line scrambled indicia.

33. The label of claim 30 wherein the pressure-sensitive adhesive is further characterized as a crosslinked acrylic adhesive.

34. The label of claim 30 wherein the polymer film (B) comprises a polyethylene terephthalate film.

35. The label of claim 30 wherein the substrate is a painted metal surface.

36. A tamper-evident label capable of depositing a footprint on a substrate when the label is printed with an impact printer and the label is applied to a substrate which comprises:

(A) a first layer comprising an imprintable matte varnish containing a fluorescent powder;

(B) a second layer comprising a clear polymer film having an upper surface and a lower surface and a thickness which is greater than the thickness of the first layer which is positioned above and in contact with the upper surface of the second layer;

(C) a third layer consisting of a clear acrylic adhesive adhered to the lower surface of the clear polymer film;

(D) a fourth layer comprising a patterned destrux varnish layer positioned beneath the clear acrylic adhesive layer;

(E) a fifth layer comprising an authentication layer positioned beneath the patterned destrux varnish layer, said patterned destrux varnish layer causing said authentication layer to appear torn by variably releasing the authentication layer when the label is removed from a substrate to which it has been applied;

(F) a sixth layer of ultraviolet cured leveling primer below and in contact with the authentication layer (E);

(G) a pressure-sensitive adhesive layer located below and in contact with said layer of leveling primer, which adhesive bonds aggressively to substrates to which the label is affixed; and (H) a backing sheet below and in contact with the pressure-sensitive adhesive layer comprised of a paper liner with a release coating containing a microencapsulated fluorescent agent.

37. The label of claim 36 wherein said authentication layer includes indicia that can be viewed without difficulty only by using a compatible authentication viewer.

38. The label of claim 36 wherein the destrux varnish layer is between the second layer (B) and the adhesive layer (C).

39. The label of claim 36 wherein the varnish layer (A) also contains a fluorescent powder.

40. The release coated liner of claim 1 wherein the microencapsulated material is released by an impact.

* * * * *